(12) United States Patent
Han et al.

(10) Patent No.: US 11,604,122 B2
(45) Date of Patent: Mar. 14, 2023

(54) CURTAIN FLOW DESIGN FOR OPTICAL CHAMBERS

(71) Applicant: TSI Incorporated, Shoreview, MN (US)

(72) Inventors: Hee-Siew Han, Minneapolis, MN (US); Jeremy Jens Kolb, Saint Paul, MN (US)

(73) Assignee: TSI Incorporated, Shoreview, MN (US)

( * ) Notice: Subject to any disclaimer, the term of this patent is extended or adjusted under 35 U.S.C. 154(b) by 0 days.

(21) Appl. No.: 17/634,539

(22) PCT Filed: Dec. 31, 2019

(86) PCT No.: PCT/US2019/069070
§ 371 (c)(1),
(2) Date: Feb. 10, 2022

(87) PCT Pub. No.: WO2021/029902
PCT Pub. Date: Feb. 18, 2021

(65) Prior Publication Data
US 2022/0268674 A1 Aug. 25, 2022

Related U.S. Application Data

(60) Provisional application No. 62/885,952, filed on Aug. 13, 2019.

(51) Int. Cl.
| | | |
|---|---|---|
| *G01N 1/40* | (2006.01) | |
| *F15D 1/02* | (2006.01) | |
| *G01N 15/06* | (2006.01) | |
| *G01N 15/00* | (2006.01) | |

(52) U.S. Cl.
CPC ............... *G01N 1/40* (2013.01); *F15D 1/025* (2013.01); *G01N 15/06* (2013.01); *G01N 2015/0046* (2013.01); *G01N 2015/0693* (2013.01)

(58) Field of Classification Search
CPC .. G01N 1/40; G01N 15/06; G01N 2015/0046; G01N 2015/0693; F15D 1/025
See application file for complete search history.

(56) References Cited

U.S. PATENT DOCUMENTS

2014/0247450 A1* 9/2014 Han ................... G01N 15/1012
356/338

FOREIGN PATENT DOCUMENTS

| CN | 105403489 A | 3/2016 |
|---|---|---|
| CN | 205958421 | 2/2017 |

(Continued)

OTHER PUBLICATIONS

"International Application Serial No. PCT/US2019/069070, International Preliminary Report on Patentability dated Dec. 3, 2021", 5 pgs.

(Continued)

*Primary Examiner* — David Z Huang
(74) *Attorney, Agent, or Firm* — Schwegman Lundberg & Woessner, P.A.

(57) ABSTRACT

Various embodiments include systems and apparatuses for reducing contamination levels within optical chambers of particle-detection instruments. In one embodiment, an apparatus to reduce contamination within an optical chamber of a particle-detection instrument is described. The apparatus includes a plenum chamber to at least partially surround an aerosol-focusing nozzle of the particle-detection instrument and accept a filtered gas flow. A curtain-flow concentrating nozzle is coupled to the plenum chamber to produce a curtain flow into the optical chamber to substantially surround an aerosol flow. Other methods and systems are disclosed.

23 Claims, 4 Drawing Sheets

(56) References Cited

FOREIGN PATENT DOCUMENTS

| | | |
|---|---|---|
| CN | 108287129 A | 7/2018 |
| JP | S60190834 | 9/1985 |
| JP | 2006058239 A | 3/2006 |
| JP | 2007033064 | 2/2007 |
| JP | 2009532670 A | 9/2009 |
| JP | 2010538277 | 12/2010 |
| JP | 2014059275 | 4/2014 |
| JP | 2017003384 | 1/2017 |
| JP | 2017146175 | 8/2017 |
| KR | 101239415 | 3/2013 |
| KR | 20190084537 | 7/2019 |
| WO | WO-2006065978 A2 | 6/2006 |
| WO | WO-2021029902 A1 | 2/2021 |

OTHER PUBLICATIONS

"International Application Serial No. PCT/US2019/069070, International Search Report dated May 29, 2020", 3 pgs.

"International Application Serial No. PCT/US2019/069070, Written Opinion dated May 29, 2020", 5 pgs.

"Korean Application Serial No. 10-2022-7007734, Notice of Preliminary Rejection dated Apr. 20, 2022", With English machine translation, 15 pgs.

"Korean Application Serial No. 10-2022-7007734, Response filed Jul. 13, 2022 to Notice of Preliminary Rejection dated Apr. 20, 2022", w English claims, 11 pgs.

"Japanese Application Serial No. 2022-509123, Notification of Reasons for Refusal dated Aug. 8, 2022", w English Translation, 8 pgs.

"European Application Serial No. 19941471.5, Response to Communication pursuant to Rules 161(2) and 162 EPC filed Oct. 3, 2022", 8 pgs.

"Japanese Application Serial No. 2022-509123, Response filed Nov. 8, 2022 to Notification of Reasons for Refusal dated Aug. 8, 2022", w/ English claims, 12 pgs.

\* cited by examiner

SECTION A-A

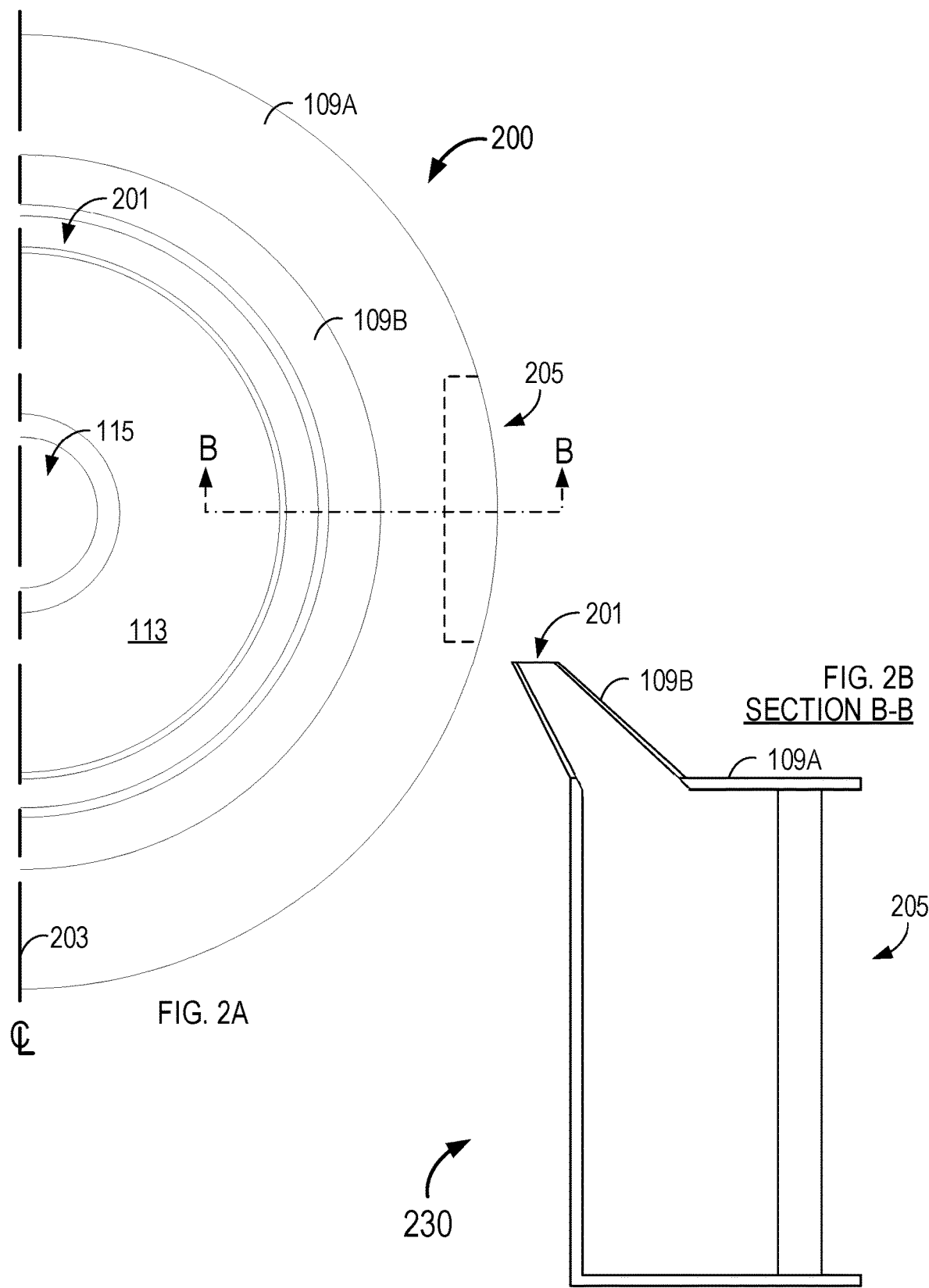

CURTAIN FLOW DESIGN FOR OPTICAL CHAMBERS

CLAIM OF PRIORITY

This application is a U.S. National Stage Filing under 35 U.S.C. § 371 from International Application No. PCT/US2019/069070, filed on Dec. 31, 2019, and published as WO 2021/029902 on Feb. 18, 2021, which claims the priority benefit to U.S. patent application Ser. No. 62/885,952, filed on 13 Aug. 2018, and entitled "CURTAIN FLOW DESIGN FOR OPTICAL CHAMBERS"; the benefit of priority of each of which is hereby claimed herein, and which applications and publication are hereby incorporated herein by reference in their entireties.

TECHNICAL FIELD

The subject matter disclosed herein relates to optical particle counters, and, more specifically, to designs for reducing contamination levels within optical chambers of particle-detection instruments.

BACKGROUND

Two of the most widely used aerosol particle instruments are optical particle counters (OPCs) and condensation particle counters (CFCs). OPCs are frequently used to measure both a size and a number concentration of aerosol particles. OPCs have proven to be a valuable tool because of their relative low cost and ability to provide real time information on aerosols of interest.

OPC instruments measure particle by means of drawing aerosol flows through an optical detection system which usually consists of a light source, lenses, mirrors and a photo detector. The optical detection system is typically referred to as optical chamber or detector chamber. An intense light source (e.g., a solid-state laser diode) is shaped and focused by one or more optical lenses to form a focused light-beam (e.g., perhaps less than about 100 µm in a minor axis to as small as being diffraction limited) so that the light intensity is substantially uniform in and focused on a small viewing-volume. To ensure that all or substantially all particles pass through this small viewing-volume, a focusing nozzle is used to narrow down the aerosol flow to a small-diameter flow stream. When a particle enters the viewing volume, the particle is illuminated by the focused light-beam and scatters the light. The scattered light is collected with one or more collector lenses and/or mirrors and is then received by a photo detector. The photo detector converts the received, scattered light into an electrical pulse. Particle counts (number concentrations) are derived from a count rate of the pulses. A size of the particles is interpreted from an intensity of the scattered light, which is proportional to pulse heights.

Condensation particle counters (CPCs) are also widely used because of their high sensitivity and high signal-to-noise ratio. CPCs detect particles by exposing them to a supersaturated vapor that condenses on particles, causing the combined condensation and particles to grow to a size typically between about 1 µm and about 10 µm that can easily be detected by light scattering, which is the same as or similar to the principle of light scattering described above with regard to the OPCs. The fluids used to generate the supersaturated vapors are typically referred to as working fluids.

Although OPC and CPC instruments use different measurement techniques and measure different properties of aerosol particle, the instruments often share a similar optical-detection system design. On both types of instrument, measurement accuracy relies on good and consistent optical signals to be produced. However, in practice, optical signals may degrade over time due to contamination on the sensitive optical components. For OPCs, the contaminants mainly come from particles in the aerosol flow-stream.

For CPCs, besides droplets in the aerosol flow, unused working fluid vapors may also contribute to the contamination. Preventing or reducing the amount of these contaminants from reaching the sensitive optical components is not an easy task. Any flow disturbances inside the optical chamber may allow particles or vapors to deviate or stray from the flow stream. These stray particles or vapors may recirculate inside the chamber and some of them may later re-enter the flow stream before later exiting the chamber. A majority of these contaminants, however, will likely deposit on walls of the optical chamber and the optical components, such as lenses, mirrors, and the photo detector. Any contamination on the optical components may reduce the light intensity of scattered light and degrade the quality of the optical signal. In many cases, the degradation can occur within a day of uses and the instrument may be inoperable within a week.

A filtered air flow design had been used by Collings et al. (2014) to prevent working fluid vapors from reaching the optical components of a CPC. However, unlike the curtain flow of the disclosed subject matter described herein, the filtered air flow in the prior art work was introduced orthogonally to the aerosol flow. The orthogonal filtered air flow design therefore introduced the filtered flow into the optical chamber, and the filtered air flow being required to turn 90 degrees before merging with the aerosol flow. Therefore, the filtered air flow did not uniformly surround the aerosol flow.

Further, some OPC instruments use a sheath flow of filtered air to enhance particle scattered light intensity and uniformity. Some high-performance CPC instruments also feature a sheath flow design for detection of smaller particle sizes. The sheath flow design may help reduce optical contamination but has several shortcomings when compared with the co-axial curtain flow design of the disclosed subject matter described herein. For example, the sheath flow design of the prior art is merged with aerosol flow before the focusing nozzle. Consequently, the combined aerosol flow and sheath flow is likely to exhibit turbulent flow downstream of the focusing nozzle due to the high air velocity caused by a small nozzle opening. As described before, any flow disturbance may cause contamination on optical elements due to stray particles and/or vapors. Additionally, a combination of the sheath flow and aerosol flow needs travel a longer distance prior to exiting the optical chamber. The long residence-time of the combined flows may allow the two flows to start mixing, resulting in some particles or vapors migrating into the sheath flow. Any particles and vapors in the sheath flow stream may end up depositing on the optical components. Therefore, the sheath flow design by itself is not sufficient to eliminate an optical contamination issue.

Contamination on the chamber walls is typically not a critical issue. However, an excessively high level of contaminant deposition may at least partially block the flow stream and increase a false count-rate of a particle-counting instrument. Therefore, keeping the optical chamber free from contamination is one step in ensuring accurate OPC and CPC measurements. Although cleaning the optical chamber may restore the instrument to an ability to accurately count particles (in the case of OPCS and CNCs) and accurately size particles in the case of an OPC), frequent cleaning may interrupt the measurement and operation of the instrument. If an instrument needs to be returned to the manufacturer for service, a significant measurement down time and operation disruption could be costly and unacceptable.

BRIEF DESCRIPTION OF THE FIGURES

FIG. 2A shows a partial plan-view of one embodiment of the curtain-flow device of FIGS. 1A and 1B;

FIG. 2B shows a cross-sectional view of the curtain-flow device of FIG. 2A;

DETAILED DESCRIPTION

Figure 1A:
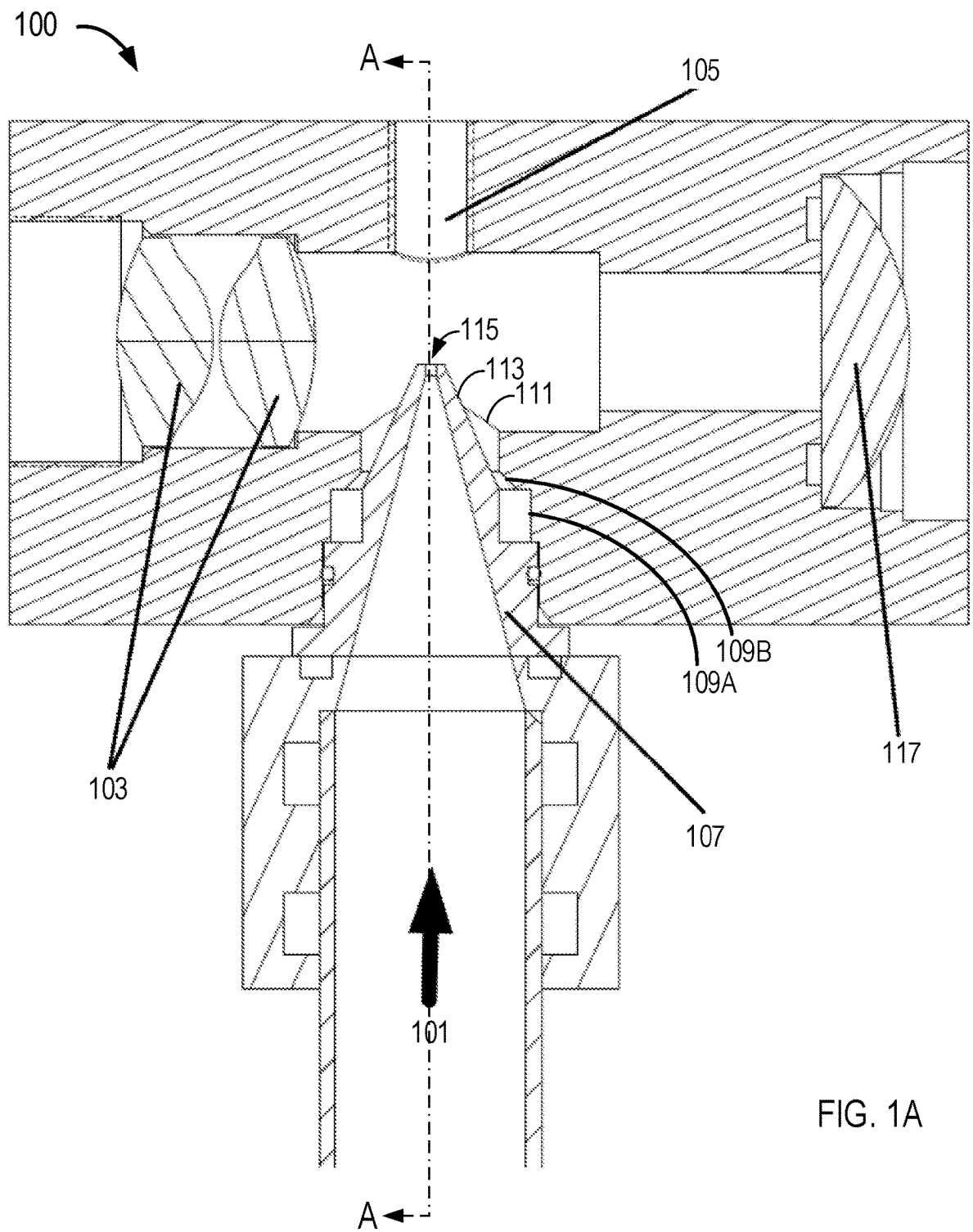
FIG. 1A shows a cross-sectional view of an optical chamber of a particle-counting instrument and an aerosol nozzle having a curtain-flow device in accordance with various embodiments of the disclosed subject matter.

The description that follows includes illustrative examples, devices, and apparatuses that embody the disclosed subject matter. In the following description, for purposes of explanation, numerous specific details are set forth in order to provide an understanding of various embodiments of the inventive subject matter. It will be evident, however, to those of ordinary skill in the art that various embodiments of the inventive subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, various exemplary embodiments discussed below focus on particular ways to reduce or minimize contamination within an optical chamber of a particle-detection instrument (e.g., optical particle counters (OPCS) and condensation particle counters (CPCs)). However, upon reading and understanding the disclosure provided herein, a person of ordinary skill in the art will readily understand that various combinations of the techniques and examples may all be applied serially or in various combinations. As an introduction to the subject, a few embodiments will be described briefly and generally in the following paragraphs, and then a more detailed description, with reference to the figures, will ensue.

As described in detail herein, one purpose of the disclosed subject matter is to disclose various embodiments of a design that allows OPC and CPC instruments to operate for long periods of time (e.g., much greater than one week as is experienced under the prior art) without a significant optical contamination issue that affects particle counting and/or sizing accuracy.

The various exemplary embodiments disclosed herein utilize a curtain flow to substantially prevent or minimize contaminants, such as particles and/or working fluid vapors, in the aerosol flow stream from reaching sensitive optical components.

With reference now to FIG. 1, a cross-sectional view of an optical chamber 100 of a particle-counting instrument and an aerosol-focusing nozzle 107 having a curtain-flow device in accordance with various embodiments of the disclosed subject matter are shown. In addition to the optical chamber 100 and the aerosol-focusing nozzle 107, FIG. 1 is shown to include a pair of collection lenses 103, a condenser lens 117, an aerosol inlet port 101, and an aerosol outlet port 105. As is known to a person of ordinary skill in the art, the collection lenses 103 and the condenser lens 117 can take a variety of forms and shapes.

The aerosol-focusing nozzle 107 has an upper portion 113 and an aerosol nozzle outlet 115. In an embodiment, the curtain-flow device comprises a plenum chamber 109A and a curtain-flow concentrating nozzle 109B. During a particle-counting operation, a combination of the plenum chamber 109A and the curtain-flow concentrating nozzle 109B provides a clean sheath of airflow, through an open area 111 and over the upper portion 113 of the aerosol-focusing nozzle 107.

The plenum chamber 109A and the curtain-flow concentrating nozzle 109B, as shown and described in more detail with reference to FIGS. 2A and 2C, below, are formed to be substantially annular or partially annular around the upper portion 113 of the aerosol-focusing nozzle 107. The plenum chamber 109A and the curtain-flow concentrating nozzle 109B may therefore be considered to have a toroidal shape.

The plenum chamber 109A and the curtain-flow concentrating nozzle 109B may be formed from a variety of materials including machined or otherwise formed aluminum, stainless steel, various plastics, and other machinable or formable materials known in the art. In an embodiment, the plenum chamber 109A and the curtain-flow concentrating nozzle 109B may be machined or formed from a single piece of material. In another embodiment, the plenum chamber 109A and the curtain-flow concentrating nozzle 109B may be machined or formed from two materials, that are either similar or dissimilar, that are joined together (e.g., by chemical adhesives, soldering, welding, mechanical fasteners, or other techniques known to a person of ordinary skill in the art).

Figure 1B:
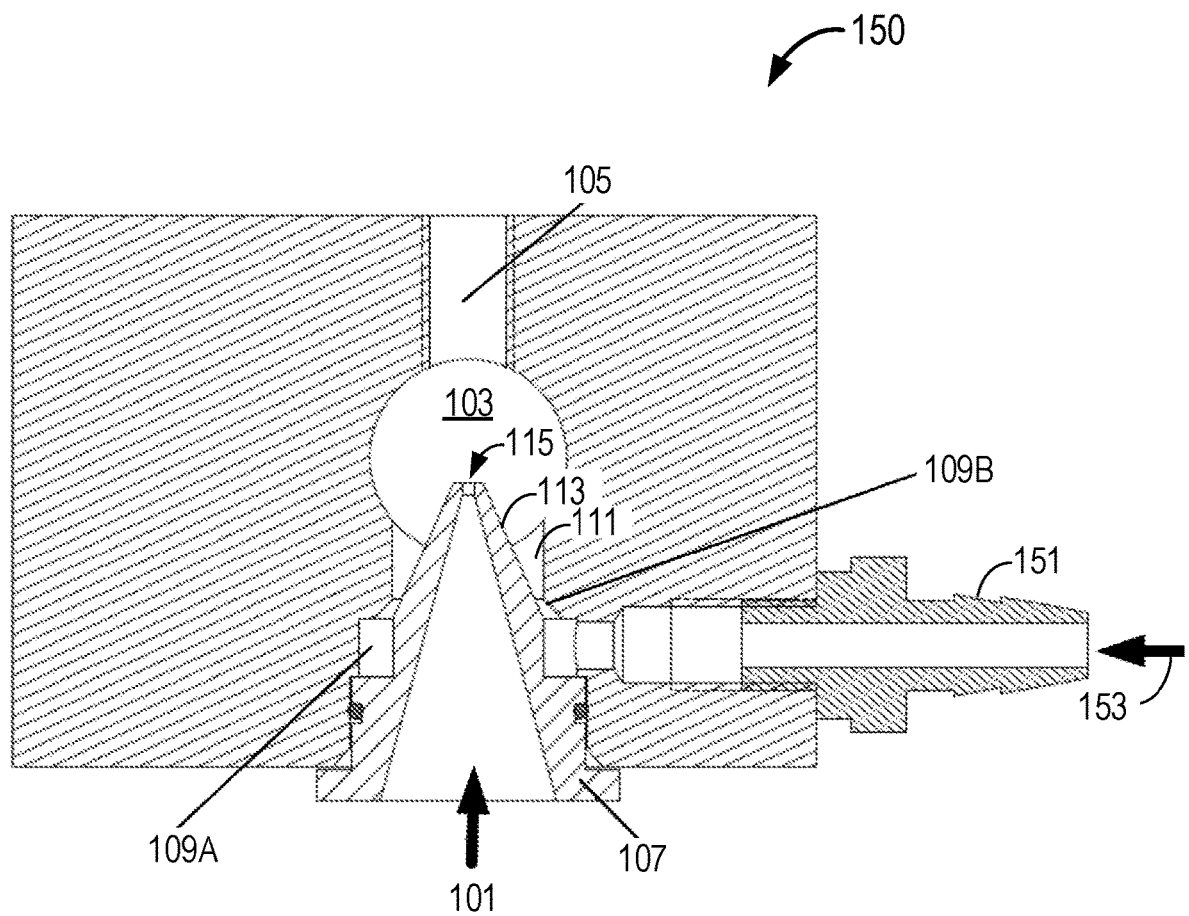
FIG. 1B shows a cross-sectional view of the optical chamber of the particle-counting instrument and the aerosol nozzle having a curtain-flow device at Section A-A of FIG. 1.

FIG. 1B shows a cross-sectional view 150 of the optical chamber 100 of the particle-counting instrument and the aerosol nozzle having the curtain-flow device at Section A-A of FIG. 1. A gas-line connector 151 allows gas-line tubing (not shown) to provide a clean (e.g., filtered), curtain gas to a gas-flow inlet 153 to the plenum chamber 109A. In a specific exemplary embodiment, the gas-line connector 151 is a barb connector (as shown). However, in other embodiments, the gas-line connector 151 may be any type of gas-line connector known in the art (e.g., a Swagelok® tube fitting, available from Swagelok Company, Solon, Ohio, USA). The gas-line tubing may comprise various types of tubing including nylon tubing, stainless-steel tubing, brass tubing, or other types of tubing known in the art. The clean gas may comprise air (e.g., clean-dry air (CDA)), an inert gas such as argon or hydrogen, or another type of filtered gas that is substantially particle free.

With concurrent reference to FIGS. 1A and 1B, during operation of the particle-counting instrument, a flow of curtain gas enters the optical chamber 100 through the gas-line connector 151. To ensure the curtain gas enters the optical chamber 100 substantially uniformly, the curtain gas is directed through the plenum chamber 109A and into the optical chamber 100 through, for example, a narrow opening (e.g., a slit) on an uppermost portion of the curtain-flow concentrating nozzle 109B. The narrow opening may comprise, for example, a single continuous slit or a series or circular or elongated slits, which are described in more detail with reference to FIGS. 2A through 2D, below.

One function of the combination of plenum chamber 109A and curtain-flow concentrating nozzle 109B is to substantially equalize flow pressure so that the curtain flow (from the gas-flow inlet 153) can be distributed substantially evenly around the upper portion 113 of the aerosol-focusing nozzle 107 before passing from the narrow opening (described with reference to FIGS. 2A through 2D, below) in the curtain-flow concentrating nozzle 109B into the open area 111 surrounding the upper portion 113, through the narrow opening.

To further enhance flow uniformity, the curtain flow can also be introduced tangentially (e.g., at an angle with reference to a circumferential direction of the plenum chamber 109A) into the plenum chamber 109A. When the curtain flow is introduced tangentially, a swirling movement of the flow fills up the plenum chamber 190A and curtain-flow concentrating nozzle 109B quickly. Once inside the optical chamber 100, the curtain flow then merges co-axially or nearly co-axially with the aerosol flow that exits from the aerosol nozzle outlet 115. Consequently, the aerosol flow is not disrupted and is substantially uniformly surrounded by the curtain flow. Therefore, all or nearly all of the potential contaminants (e.g., particles and vapors) are contained inside the aerosol flow. The combined aerosol flow and curtain flow then passes through the focused light-beam, described above, where particles are illuminated and counted before exiting from the aerosol outlet port 105.

A location of the aerosol outlet port 105 could be anywhere in the optical chamber 100 as long as it is located downstream of the focused light-beam. However, in one embodiment, the location of the aerosol outlet port 105 is opposite the aerosol-focusing nozzle 107, as shown in FIGS. 1A and 1B. This location provides the shortest distance between the aerosol-focusing nozzle 107 and the aerosol outlet port 105. When the aerosol outlet port 105 is opposite from the aerosol-focusing nozzle 107, a probability of contaminants traversing the curtain flow to reach the sensitive optical components is reduced or minimized. The straight flow path from the aerosol-focusing nozzle 107 to the aerosol outlet port 105 also avoids any change in flow direction, which potentially could introduce flow disturbances resulting in a higher probability of particles and/or working fluid vapors deviating from the flow path and contaminating the optical chamber 100, including the optical elements (e.g., one or more surfaces of the collection lenses 103 and/or the condenser lens 117).

In addition to reducing or minimizing contamination within the optical chamber 100, the curtain flow also provides an added benefit of reducing particle impaction losses to the walls of the optical chamber 100. With the curtain flow, particles are restricted substantially to a middle-portion of the combined aerosol flow and curtain flow. For example, in a CPC instrument, a common issue occurs when warm working-fluid vapors condense on cooler tubing walls resulting in a "foggy" tubing scenario. If excess condensates are formed, CPC flow rates may be affected, thereby resulting in higher measurement uncertainties. The curtain flow design of the disclosed subject matter helps to reduce, minimize, or prevent the foggy tubing issue as the curtain flow allows warm vapors to continue to cool down in the middle-portion of the flow, while separating warm working-fluid vapors from cool tubing walls.

The co-axial or nearly co-axial curtain flow design of the disclosed subject matter has many advantages over the orthogonal filtered air flow design of the prior art described above. For example, the co-axial or nearly co-axial curtain flow merges smoothly with the aerosol flow as both flow in the same direction. In comparison, the orthogonal filtered air flow needs to turn 90 degrees before merging with the aerosol flow. The 90-degree turn in flow direction is likely to generate flow turbulence, which could reduce the effectiveness of the curtain flow. Additionally, to reduce or minimize contamination of the optical chamber 100, the particle laden or vapor laden aerosol flow can be surrounded substantially fully and uniformly by the curtain flow.

With reference now to FIG. 2A, a partial plan-view 200 of one embodiment of the curtain-flow device of FIGS. 1A and 1B is shown. The partial plan-view 200 can be mirrored about a center-line 203 to fully visualize the plan view of the curtain-flow device. FIG. 2A is shown to include a circular slit 201 that traverses an uppermost portion of the curtain-flow concentrating nozzle 109B. A filtered gas-flow from the gas-flow inlet 153 (FIG. 1B) enters the plenum chamber 109A at a gas-flow inlet 205. FIG. 2B shows a cross-sectional view 230 (at Section B-B of FIG. 2A) of the curtain-flow device of FIG. 2A.

In a specific exemplary embodiment, a volumetric flow rate into the combination of the plenum chamber 109A and the curtain-flow concentrating nozzle 109B may be about 1 liter per minute (1 μm). An opening (as viewed along the cross-section of FIG. 2B) of the circular slit 201, may be about 0.50 mm (approximately 0.020 inches). In other embodiments, the volumetric flow rate and the of the circular slit 201 may be considerably larger or considerably smaller based on factors including a volumetric flow rate at which a sampled aerosol is drawn through the aerosol inlet port 101 (FIG. 1), a level of acceptable coincidence loss of particles for a particular application, an overall volume of the plenum chamber 109A, an angle of tangential flow (if any), and a number of other factors known to a skilled artisan.

Figures 2C, 2D:
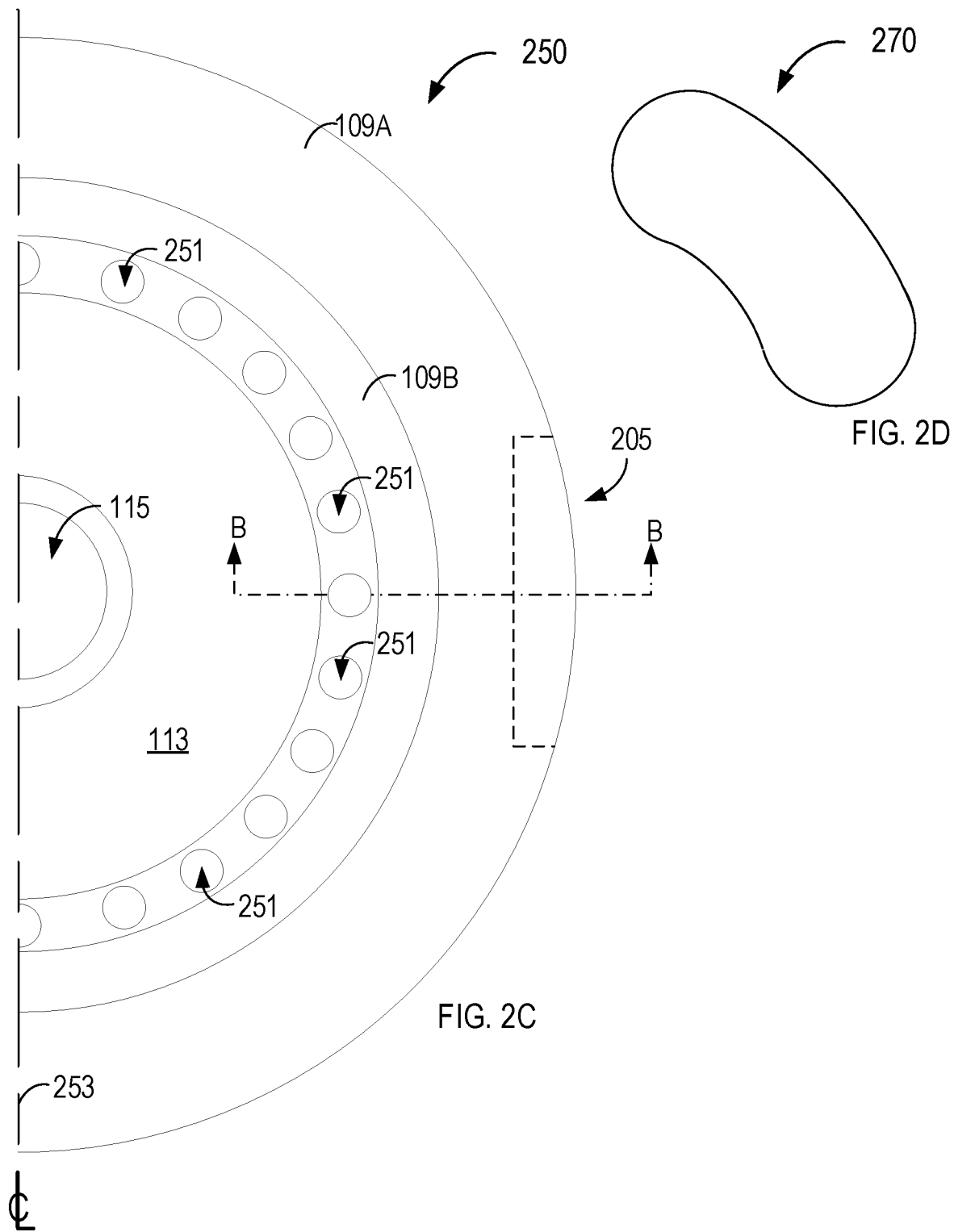
FIG. 2C shows an alternative embodiment of a partial plan-view of the curtain-flow device of FIGS. 1A and 1B.
FIG. 2D shows an embodiment of a curtain-flow opening that may be used separately or in conjunction with the curtain-flow devices of FIGS. 2A and 2B.

FIG. 2C shows an alternative embodiment of a partial plan-view 250 of the curtain-flow device of FIGS. 1A and 1B. As with FIG. 2A, the partial plan-view 250 can be mirrored about a center-line 253 to fully visualize the plan view of the curtain-flow device. In this embodiment, rather than having a continuous version of the circular slit 201 of FIG. 2A, the partial plan-view 250 shows a plurality of openings 251. Although the openings 251 are shown to be circular, the openings 251 can take on nearly any shape such as square, rectangular, elliptical, and so on, or any combination thereof. Additionally, although the openings are shown to be equally spaced, the openings 251 may be non-uniformly spaced. A person of ordinary skill in the art, upon reading and understanding the disclosed subject matter, will recognize how to determine how many openings, what sizes of openings, what volumetric flow rates, a relative velocity of gas flowing through the openings, and so. For example, the skilled artisan may use computational fluid dynamic (CFD) analysis to determine sizes, shapes, and spacings of the openings 251.

FIG. 2D shows an embodiment of a curtain-flow opening 270 that may be used separately or in conjunction with the curtain-flow devices of FIGS. 2A and 2C. In this embodiment, the curtain-flow opening 270 may be formed by a small end-mill (e.g., having a dimeter of about 0.50 mm) set at a given radius (e.g., along a mid-point of an uppermost portion of the curtain-flow concentrating nozzle 109B) from a mid-point of, for example, a center of the aerosol nozzle outlet 115.

Included in the disclosed subject matter provided herein are various system and apparatus diagrams describing various embodiments of the curtain flow design. Therefore, the description above includes illustrative examples, devices, systems, and apparatuses that embody the disclosed subject matter. In the description, for purposes of explanation, numerous specific details were set forth in order to provide an understanding of various embodiments of the inventive subject matter. It will be evident, however, to those of ordinary skill in the art that various embodiments of the inventive subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, although various exemplary embodiments discussed herein focus on particular ways to produce a curtain flow design, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other particulate matter sensor calibration system embodiments discussed herein.

Consequently, many modifications and variations can be made, as will be apparent to the person of ordinary skill in the art upon reading and understanding the disclosure provided herein. Functionally equivalent devices and apparatuses are within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. An apparatus to reduce contamination within an optical chamber of a particle-detection instrument, the apparatus comprising:

a plenum chamber to at least partially surround an aerosol-focusing nozzle of the particle-detection instrument, the plenum chamber to accept a filtered gas flow; and a curtain-flow concentrating nozzle coupled to an output of the plenum chamber to produce a curtain flow into the optical chamber to substantially surround an aerosol flow, the filtered gas flow being configured to be introduced tangentially into the plenum chamber to produce a swirling movement of the filtered gas flow in the plenum chamber.

2. The apparatus of claim 1, further comprising an open area coupled to an output of the curtain-flow concentrating nozzle and at least partially surrounding the aerosol-focusing nozzle.

3. The apparatus of claim 2, wherein a combination of the plenum chamber, the curtain-flow concentrating nozzle, and the open area are arranged to provide a clean sheath of airflow around the aerosol flow.

4. The apparatus of claim 2, wherein a combination of the plenum chamber and the curtain-flow concentrating nozzle is to substantially equalize flow pressure such that the curtain flow is distributed substantially evenly around an upper portion of the aerosol-focusing nozzle before passing from an outlet of the curtain-flow concentrating nozzle into the open area surrounding the upper portion, through the outlet.

5. The apparatus of claim 1, wherein the plenum chamber and the curtain-flow concentrating nozzle are at least partially annular around an upper portion of the aerosol-focusing nozzle.

6. The apparatus of claim 1, wherein the plenum chamber and the curtain-flow concentrating nozzle have a toroidal shape.

7. The apparatus of claim 1, wherein the curtain flow is to be supplied from the curtain-flow concentrating nozzle by a continuous single slit on an outlet of the curtain-flow concentrating nozzle.

8. The apparatus of claim 1, wherein the curtain flow is to be supplied from the curtain-flow concentrating nozzle by a series of slits on an outlet of the curtain-flow concentrating nozzle.

9. The apparatus of claim 8, wherein the series of slits is selected from at least one shape including circular slits and elongated slits.

10. The apparatus of claim 1, wherein the contamination includes at least one type of contamination including particle contamination and working-fluid vapor contamination.

11. An apparatus to reduce contamination within a particle-detection instrument, the apparatus comprising a curtain-flow concentrating nozzle coupled to accept a filtered gas flow and produce a curtain flow into an optical chamber of the particle-detection instrument, the curtain flow to substantially surround a particle-laden aerosol flow within the particle-detection instrument, the curtain flow being configured to be introduced tangentially with reference to the particle-laden aerosol flow to produce a swirling movement of the curtain flow.

12. The apparatus of claim 11, further comprising a plenum chamber coupled between the filtered gas flow and the curtain-flow concentrating nozzle.

13. The apparatus of claim 12, wherein the plenum chamber to at least partially surround the aerosol-focusing nozzle of the particle-detection instrument.

14. The apparatus of claim 12, wherein the tangentially-introduced curtain flow is also introduced at an angle with reference to a circumferential direction of the plenum chamber, to produce the swirling movement of the curtain flow in the plenum chamber.

15. The apparatus of claim 11, wherein the contamination includes at least one type of contaminant selected from contaminant types including particle contamination and working fluid vapor contamination.

16. The apparatus of claim 11, wherein the curtain flow is to be supplied from the curtain-flow concentrating nozzle by a continuous single slit on an outlet of the curtain-flow concentrating nozzle.

17. The apparatus of claim 11, wherein the curtain flow is to be supplied from the curtain-flow concentrating nozzle by a series of slits on an outlet of the curtain-flow concentrating nozzle.

18. The apparatus of claim 17, wherein the series of slits is selected from at least one shape including square slits, rectangular slits, and elliptical slits.

19. The apparatus of claim 11, wherein curtain flow is further configured to at least substantially surround working-fluid vapors within the particle-detection instrument.

20. An apparatus to reduce contamination in a particle-detection instrument, the apparatus comprising:
a plenum chamber surrounding an aerosol-focusing nozzle of the particle-detection instrument, the plenum chamber to accept a filtered gas flow;
a curtain-flow concentrating nozzle coupled to an outlet of the plenum chamber to produce a curtain flow into the optical chamber to substantially surround an aerosol flow, the filtered gas flow being configured to be introduced tangentially into the plenum chamber to produce a swirling movement of the filtered gas flow in the plenum chamber; and
an open area coupled to an output of the curtain-flow concentrating nozzle and at least partially surrounding the aerosol-focusing nozzle to reduce at least one of particle contaminants and working-fluid vapors.

21. The apparatus of claim 20, wherein the plenum chamber and the curtain-flow concentrating nozzle have a toroidal shape.

22. The apparatus of claim 20, wherein the curtain flow is to be supplied from the curtain-flow concentrating nozzle by a continuous single slit on an outlet of the curtain-flow concentrating nozzle.

23. The apparatus of claim 20, wherein the curtain flow is to be supplied from the curtain-flow concentrating nozzle by a series of slits on an outlet of the curtain-flow concentrating nozzle.

* * * * *

UNITED STATES PATENT AND TRADEMARK OFFICE
CERTIFICATE OF CORRECTION

PATENT NO. : 11,604,122 B2
APPLICATION NO. : 17/634539
DATED : March 14, 2023
INVENTOR(S) : Han et al.

It is certified that error appears in the above-identified patent and that said Letters Patent is hereby corrected as shown below:

In the Specification

In Column 1, Line 28, delete "(CFCs)." and insert --(CPCs).-- therefor

In Column 2, Line 50, after "needs", insert --to--

In Column 2, Line 67, delete "OPCS" and insert --OPCs-- therefor

In Column 3, Line 1, delete "in" and insert --(in-- therefor

In Column 3, Line 50, delete "(OPCS)" and insert --(OPCs)-- therefor

In the Claims

In Column 8, Lines 50-51, in Claim 11, delete "p article-detection" and insert --particle-detection-- therefor Signed and Sealed this
Thirtieth Day of July, 2024

Katherine Kelly Vidal
*Director of the United States Patent and Trademark Office*